United States Patent
Roychoudhury et al.

(10) Patent No.: US 9,827,939 B1
(45) Date of Patent: Nov. 28, 2017

(54) AIRBAG WITH INDIVIDUALLY TUNABLE COMPARTMENTS

(71) Applicant: Ford Global Technologies, LLC, Dearborn, MI (US)

(72) Inventors: Raj S. Roychoudhury, Bloomfield Hills, MI (US); Roger J. Chen, Oxford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/148,205

(22) Filed: May 6, 2016

(51) Int. Cl.
| | |
|---|---|
| *B60R 21/16* | (2006.01) |
| *B60R 21/233* | (2006.01) |
| *B60R 21/207* | (2006.01) |
| *B60R 21/261* | (2011.01) |
| *B60R 21/00* | (2006.01) |
| *B60R 21/26* | (2011.01) |
| *B60R 21/231* | (2011.01) |

(52) U.S. Cl.
CPC .......... *B60R 21/233* (2013.01); *B60R 21/207* (2013.01); *B60R 21/261* (2013.01); *B60R 2021/0004* (2013.01); *B60R 2021/0032* (2013.01); *B60R 2021/0041* (2013.01); *B60R 2021/0048* (2013.01); *B60R 2021/0051* (2013.01); *B60R 2021/0053* (2013.01); *B60R 2021/0055* (2013.01); *B60R 2021/23153* (2013.01); *B60R 2021/23324* (2013.01); *B60R 2021/2615* (2013.01); *B60R 2021/26094* (2013.01)

(58) Field of Classification Search
CPC . B60R 21/205; B60R 21/2334; B60R 21/206; B60R 2021/23332; B60R 21/239; B60R 2021/23324
USPC ................................ 280/730.2, 743.1, 743.2
See application file for complete search history.

(56) References Cited

U.S. PATENT DOCUMENTS

| | | | |
|---|---|---|---|
| 3,747,952 A | 7/1973 | Graebe | |
| 6,199,900 B1 | 3/2001 | Zeigler | |
| 8,215,665 B2 * | 7/2012 | Ohara | ................... B60R 21/206 |
| | | | 280/729 |
| 8,596,678 B2 * | 12/2013 | Ravenberg | ........ B60R 21/23138 |
| | | | 280/729 |

(Continued)

FOREIGN PATENT DOCUMENTS

| | | |
|---|---|---|
| DE | 10106238 A1 | 9/2002 |
| DE | 10201836 A1 | 8/2003 |

(Continued)

OTHER PUBLICATIONS

UK Search Report dated Sep. 21, 2017, Appl. No. GB1706702.6.

*Primary Examiner* — Toan To
(74) *Attorney, Agent, or Firm* — Frank A. MacKenzie; Bejin Bieneman PLC

(57) ABSTRACT

An airbag includes a manifold having an outer panel and an inflation chamber defined at least in party by the outer panel. The airbag further includes a first compartment and a second compartment spaced from the first compartment connected to the outer panel and positioned external to the inflation chamber. A first one-way valve is in fluid communication with the manifold and the first compartment, and a second one-way valve is in fluid communication with the manifold and the second compartment.

15 Claims, 7 Drawing Sheets

(56) References Cited

U.S. PATENT DOCUMENTS

| | | | |
|---|---|---|---|
| 8,684,400 B2* | 4/2014 | Picard | B60R 21/2338 |
| | | | 280/729 |
| 8,746,734 B1 | 6/2014 | Smith et al. | |
| 8,757,657 B1* | 6/2014 | Hotta | B60R 21/233 |
| | | | 280/730.2 |
| 9,296,357 B2* | 3/2016 | Fujiwara | B60R 21/207 |
| 2006/0186655 A1* | 8/2006 | Ehrke | B60R 21/233 |
| | | | 280/743.1 |
| 2007/0013174 A1* | 1/2007 | Riedel | B60R 21/233 |
| | | | 280/730.2 |
| 2009/0039626 A1* | 2/2009 | Yokota | B60R 21/237 |
| | | | 280/730.2 |
| 2010/0140906 A1* | 6/2010 | Honda | B60R 21/23138 |
| | | | 280/730.2 |
| 2012/0112441 A1* | 5/2012 | Ohara | B60R 21/205 |
| | | | 280/729 |
| 2014/0151984 A1* | 6/2014 | Fukawatase | B60R 21/233 |
| | | | 280/730.2 |

FOREIGN PATENT DOCUMENTS

| | | | |
|---|---|---|---|
| EP | 1193141 A2 | 4/2002 |
| JP | 2008222154 A | 9/2008 |
| JP | 201036870 A | 2/2010 |
| JP | 2014237382 A | 12/2014 |
| JP | 2016016730 A | 2/2016 |

* cited by examiner

US 9,827,939 B1

AIRBAG WITH INDIVIDUALLY TUNABLE COMPARTMENTS

BACKGROUND

Vehicles may include a variety of airbag assemblies to deploy airbags during vehicle impacts to absorb impact energy from vehicle occupants during the impact. The airbag assembly may include an airbag and an inflator in fluid communication with the airbag. The inflator may inflate the airbag with an inflation medium to inflate the airbag from an uninflated position to an inflated position. The vehicle may include an impact sensing system in communication with the airbag assembly. The impact sensing system may sense a vehicle impact and instruct the inflator to inflate the airbag when a vehicle impact is sensed.

Airbag assemblies for occupants in a rear seat of the vehicle can present different design criteria than those for occupants in a front seat. For example, airbag assemblies for occupants in the front seat may be designed for and mounted in an instrument panel and/or a steering wheel of the vehicle. The rear seats of vehicles generally lack comparable structures for the design and mounting of airbag assemblies. Rather, occupants in the rear seats are generally proximate a seat back of the front seat of the vehicle.

DETAILED DESCRIPTION

Figure 1:
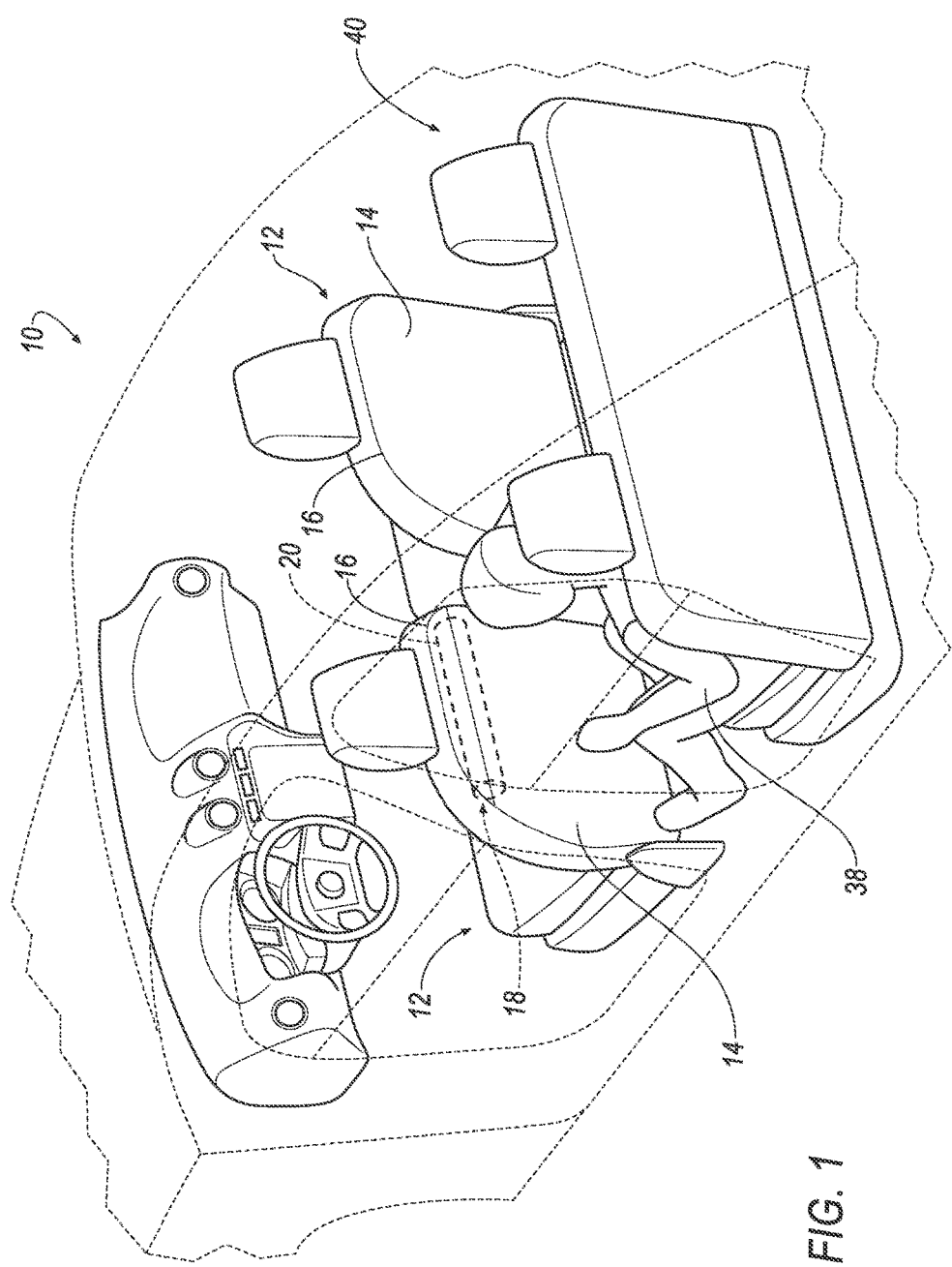
FIG. 1 is a perspective view of a portion of a vehicle including a seatback with an airbag assembly shown in hidden lines at a top end of the seatback, and an occupant seated behind the seatback.
Figure 2:
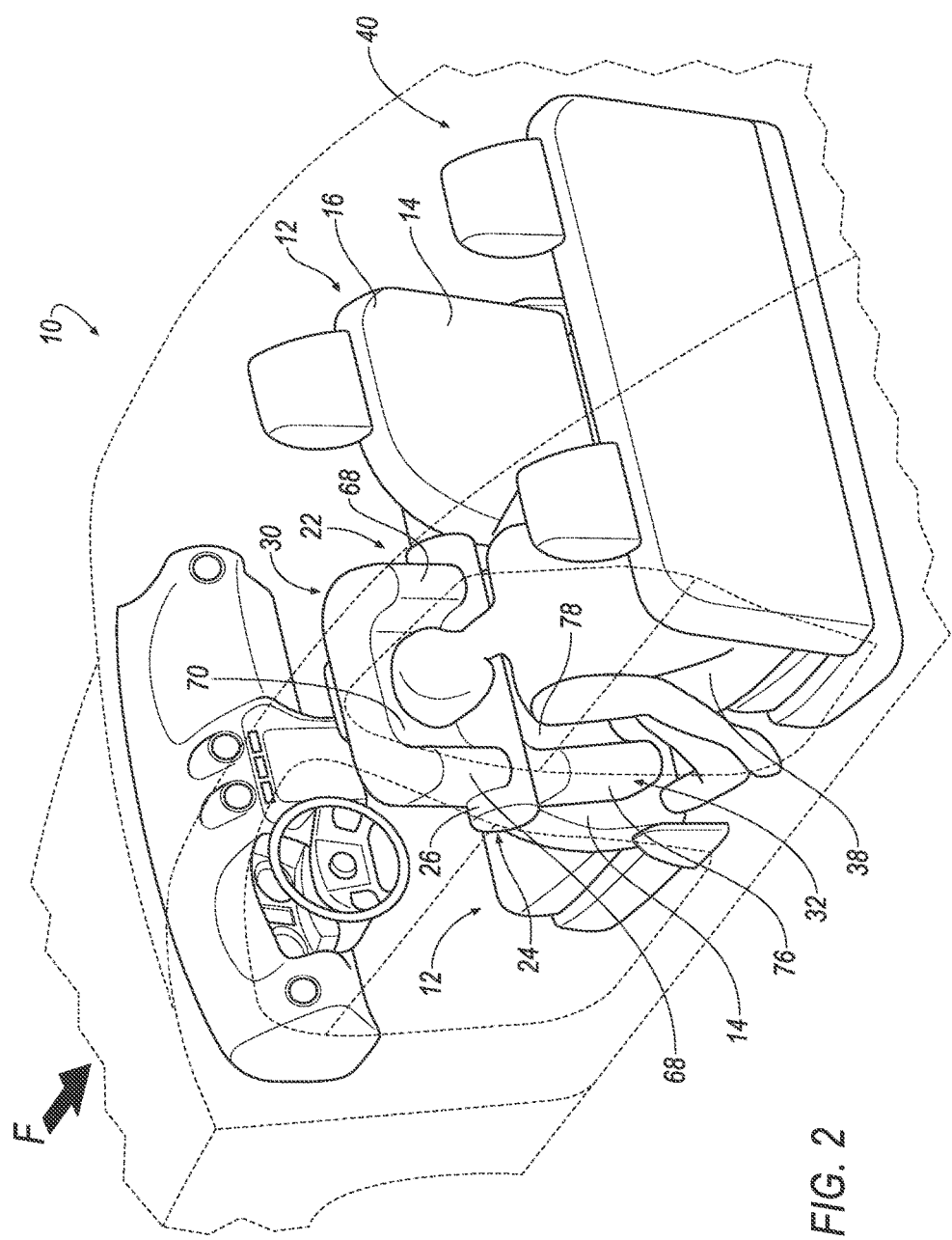
FIG. 2 is a perspective view of the portion of the vehicle including the seatback from FIG. 1, with the occupant moving toward the seatback and the airbag in an inflated position.

With reference to the Figures, wherein like numerals indicate like parts throughout the several views, FIGS. 1 and 2 show a vehicle 10 and a seat assembly 12. The seat assembly 12 has a seatback 14. An airbag assembly 18, i.e., an airbag module, is housed in the seatback 14, e.g., at a top end 16 of the seatback 14. The airbag assembly 18 includes a housing 20 and an airbag 22 disposed in the housing 20. The airbag 22 is inflatable from an uninflated position, as shown in FIG. 1, to an inflated position, as shown in FIGS. 2-3D. The airbag 22 extends from the housing 20 and the seatback 14 in the inflated position.

Figure 3A:
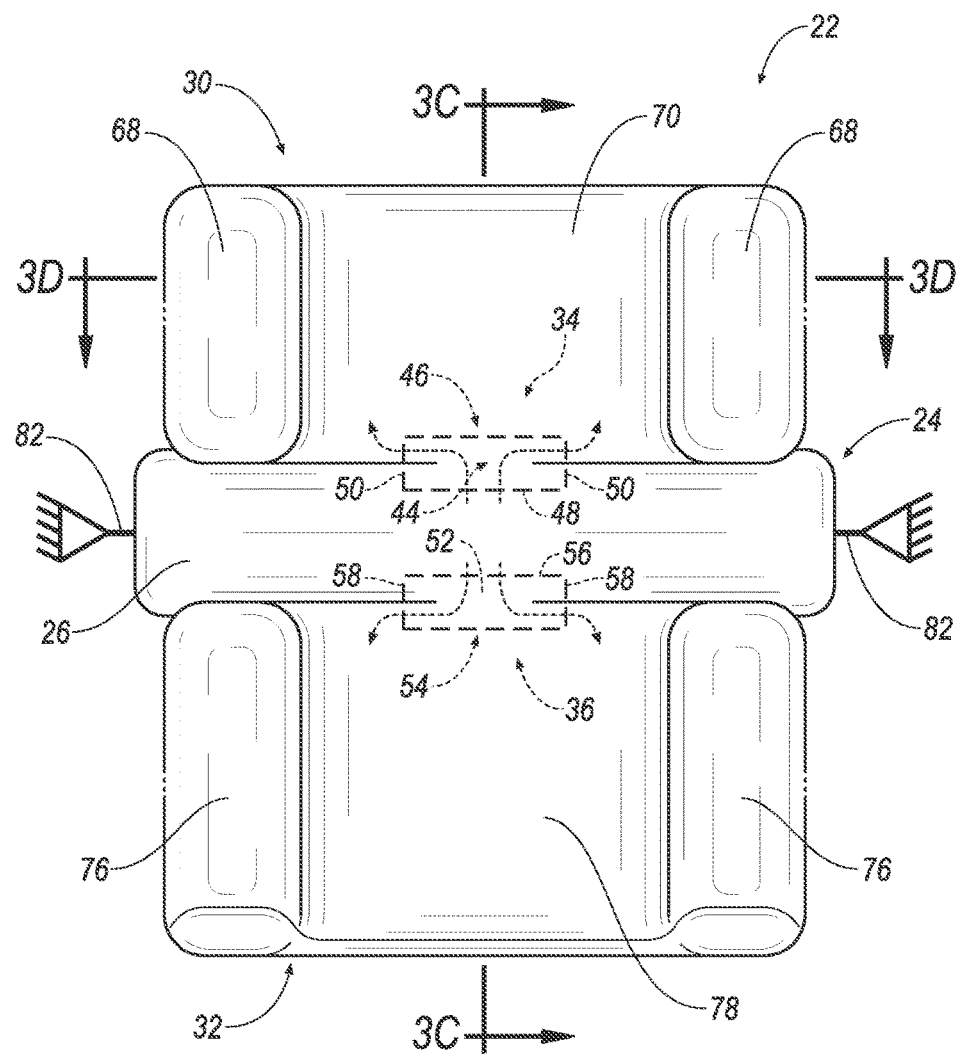
FIG. 3A is a side view of the airbag inflating to the inflated position with a first flap of a first one-way valve and a second flap of a second one-way valve shown in hidden lines.
Figure 3B:
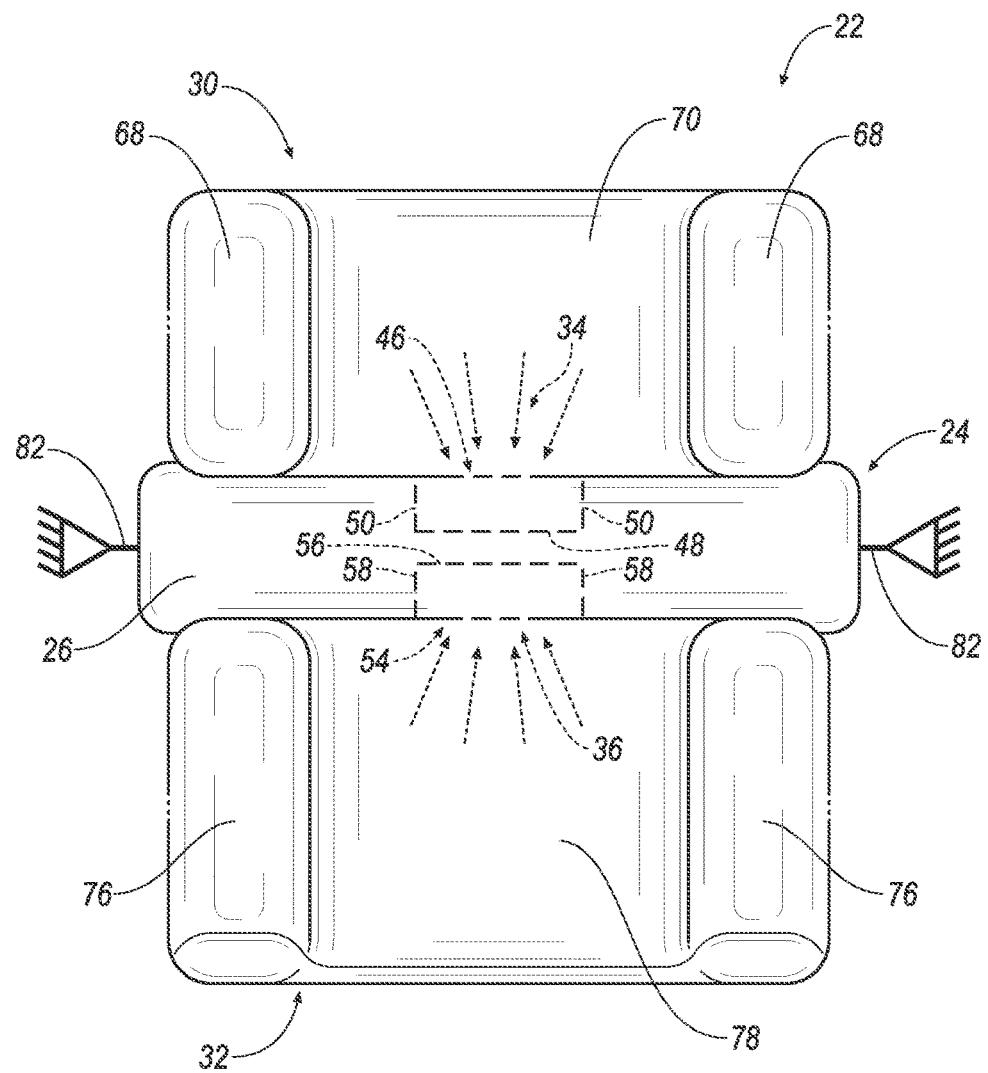
FIG. 3B is a side view of the airbag in the inflated position with the first flap of the first one-way valve and the second flap of the second one-way valve shown in hidden lines.
Figure 3C:
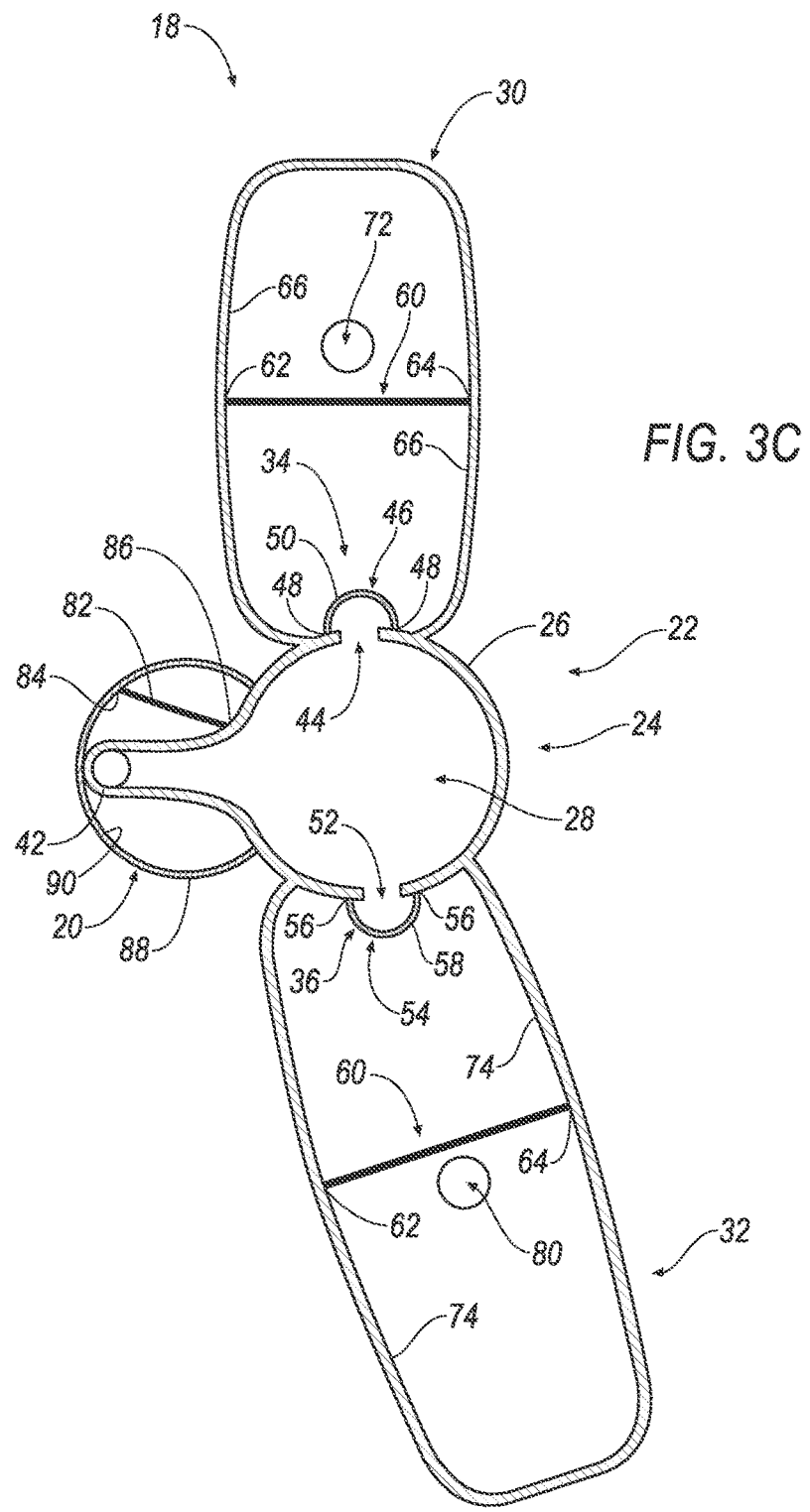
FIG. 3C is a cross-sectional view of the airbag assembly and the airbag inflating to the inflated position along line 3C of FIG. 3A.
Figure 3D:
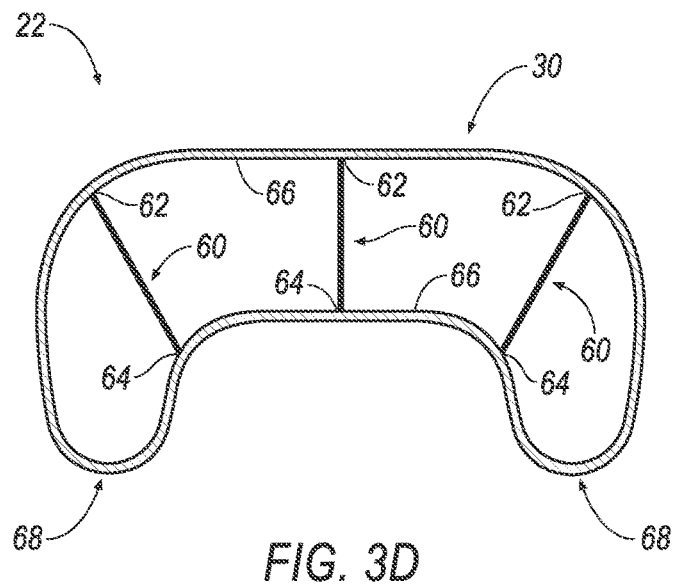
FIG. 3D is a cross-sectional view of the first compartment of the airbag along line 3D of FIG. 3A.

As shown in FIGS. 3A-3C, the airbag 22 includes a manifold 24 having an outer panel 26 and an inflation chamber 28. The inflation chamber 28 is defined at least in part by the outer panel 26. The airbag 22 also includes a first compartment 30 and a second compartment 32. The first compartment 30 and the second compartment 32 are connected to the outer panel 26 and are external to the inflation chamber 28 of the manifold 24, with the second compartment 32 spaced from the first compartment 30. A first one-way valve 34 is in fluid communication with the manifold 24 and the first compartment 30, and a second one-way valve 36 is in fluid communication with the manifold 24 and the second compartment 32.

As shown in FIG. 3B, when the airbag 22 is in the inflated position, the first one way valve 34 may restrict or prevent an inflation medium, e.g., a gas, from flowing from the first compartment 30 into the manifold 24, and the second one-way valve 36 may restrict or prevent the inflation medium from flowing from the second compartment 32 into the manifold 24. For example, in a scenario where an occupant 38 impacts the first compartment 30, the impact may create a positive pressure difference between the first compartment 30 and the manifold 24. In this instance, the first one-way valve 36 may restrict or prevent flow of inflation medium from the first compartment 30 to the manifold 24. Similarly, the second one-way valve 38 may restrict or prevent flow of inflation medium from the second compartment 32 into the manifold 24 when the occupant 38 impacts the second compartment 32.

This allows for the first compartment 30 and the second compartment 32 to be independently tuned for stiffness, i.e., pressure, among other things. For example, the first compartment 30 may be tuned to a different pressure than the second compartment 32 when the airbag 22 is in the inflated position. In this way, the first compartment 30 and the second compartment 32 may be independently tuned to absorb energy from different parts of the occupant 38, such as a head, a torso, and extremities in an impact event.

With reference to FIGS. 1 and 2, the vehicle 10 may include adjacent seat assemblies 12 arranged in a front row of the vehicle 10. The vehicle 10 may also include a rear seat assembly 40 located behind the front row relative to a vehicle-forward direction. The vehicle 10 can include any number of seat assemblies 12 arranged in any number of rows. One or more of the seat assemblies 12 may include the airbag assembly 18, including the rear seat assembly 40. In FIG. 1, the airbag assembly 18 is shown on the driver seat assembly 12, i.e., the left front seat assembly 12. In addition, or in the alternative, the airbag assembly 18 may be on the passenger seat assembly 12, i.e., the right front seat assembly 12. The vehicle 10 may be of any suitable type, including a car, truck, SUV, etc.

As shown in FIGS. 1 and 2, the occupant 38 may be seated behind the seat assembly 12 including the airbag assembly 18. During a frontal impact of the vehicle 10, the occupant 38 may move toward the seat assembly 12. As further discussed below, the airbag 22 disposed in the seatback 14 may be selectively inflated based on a magnitude of the impact.

For example, as shown in FIG. 2, during a front end impact (identified as "F" in FIG. 2), the airbag 22 may inflate and extend from the seatback 14. The manifold 24 of the airbag 22 may extend along a length of the seatback 14 and may be elongated horizontally in a cross-vehicle direction. The first compartment 30 may extend upwardly from the manifold 24 in a substantially vertical direction, e.g., in a direction toward a vehicle roof. The second compartment 32 may extend downwardly from the manifold 24 in a substantially vertical direction, e.g., in a direction toward a vehicle floor. In this situation, as the occupant 38 continues to move in a forward motion, the airbag 22 in the inflated position may reduce the likelihood of the occupant 38 contacting the seatback 14 and other structures, and may result in a reduction of impact energy transferred to the occupant 38.

Figure 4:
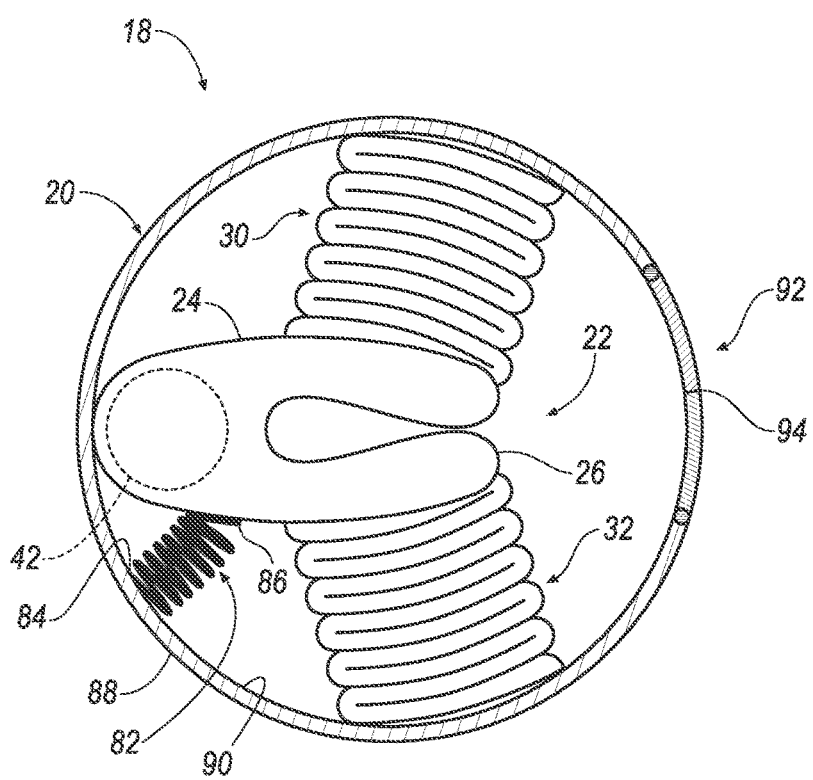
FIG. 4 is a cross-sectional view of the airbag assembly when the airbag is in an uninflated position.
Figure 5:
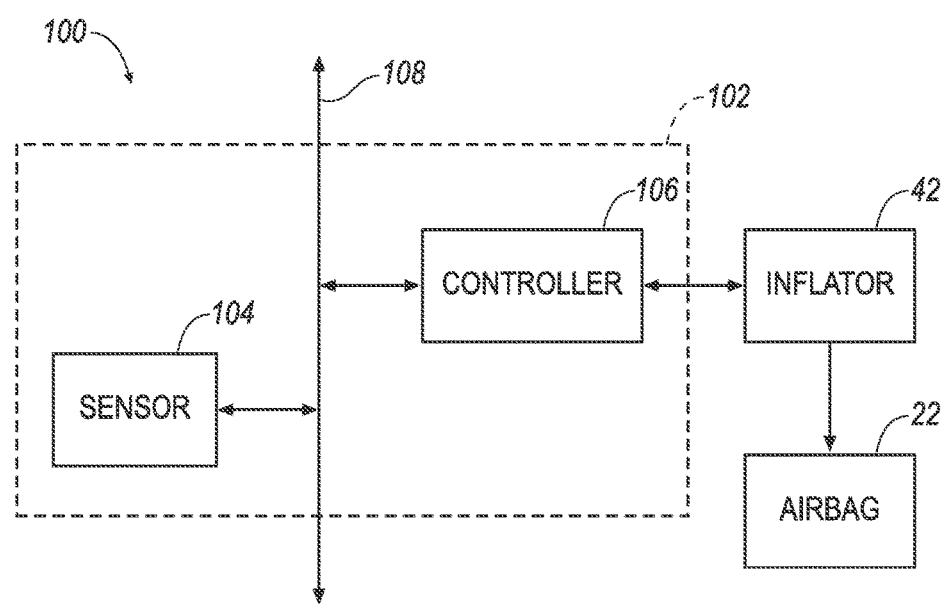
FIG. 5 is a schematic of an impact absorbing system of the vehicle.

The airbag 22 may be a component of an impact absorbing system 100, as shown in FIG. 5 and further discussed below. The impact absorbing system 100 may include an inflator 42 in fluid communication with the airbag 22. The inflator 42 may be supported by the seatback 14. In the example shown in FIG. 4, the inflator 42 may be disposed in the housing 20 of the airbag assembly 18, and, as shown in FIG. 1, the airbag assembly 18 may be disposed in that seatback 14, such as at the top end 16 the seatback 14.

The inflator 42 expands the airbag 22 with the inflation medium. The inflator 42 may be, for example, a pyrotechnic inflator that uses a chemical reaction to drive inflation medium into the airbag 22. As such, when the impact absorbing system 100 activates the pyrotechnic inflator, a chemical reaction occurs causing the inflator 42 to fill the airbag 22 with the inflation medium. The inflator 42 may also be a cold-gas inflator. When activated, the cold-gas inflator ignites a pyrotechnic charge that releases the inflation medium to the airbag 22. Alternatively, the inflator 42 can be of any other suitable type, such as a hybrid inflator The inflator 42 is in fluid communication with the airbag 22, as set forth above. As shown in FIGS. 3C and 4, the inflator 42 may be disposed in the inflation chamber 28 of the manifold 24. The inflator 42 may include fasteners (not shown), e.g., threaded bolts, which pass through openings (not shown) in the outer panel 26 of the manifold 24 to affix the airbag 22 and the inflator 42 to brackets (not shown) on an interior surface 90 of the housing 20. Alternatively, the inflator 42 may be external to the manifold 24 of the airbag 22. The manifold 24 includes the outer panel 26 that defines the inflation chamber 28 at least in part.

As shown in FIGS. 3A-3C, the airbag 22 includes the first one-way valve 34. The first one-way valve 34 is in fluid communication with the manifold 24 and the first compartment 30. The first one-way valve 34 can be of any suitable type that would allow the inflation medium to flow from the manifold 24 to the first compartment 30 in response to a positive pressure difference between the manifold 24 and the first compartment 30, and would restrict the inflation medium from flowing from the first compartment 30 to the manifold 24 when there is a positive pressure difference between the first compartment 30 and the manifold 24. Suitable one-way valves can include a ball check valve, a diaphragm check valve, and a lift-check valve, among other types of one-way valves.

In the example of the first one-way valve 34 shown in FIGS. 3A-3C, the first one-way valve 34 includes a first opening 44 extending through the outer panel 26 of the manifold 24 and in fluid communication with the first compartment 30.

A first flap 46 is disposed between the outer panel 26 and the first compartment 30. The first flap 46 may be supported by the outer panel 26. For example, as shown in FIG. 3C, the first flap 46 may include two first edges 48 that are fixed to the outer panel 26, and two second edges 50 that are not connected to the outer panel 26. The two first edges 48 may be spaced apart and substantially parallel relative to each other. One of the first edges 48 can be fixed to the outer panel 26 on one side of the first opening 44, and the other first edge 48 can be fixed to the outer panel 26 on an opposite side of the first opening 44. The two second edges 50 may also be spaced apart and substantially parallel relative to each other, with one of the second edges 50 disposed on one side of the first opening 44, and the other second edge 50 disposed on an opposite side of the first opening 44.

As shown in FIGS. 3A and 3C, when the pressure in the manifold 24 is greater than the pressure in the first compartment 30, the second edges 50 may separate from the outer panel 26, and the inflation medium can flow from the inflation chamber 28 of the manifold 24 to the first compartment 30. As shown in FIG. 3B, when the pressure in the first compartment 30 is greater than the pressure in the manifold 24, the second edges 50 of the first flap can contact the outer panel 26, restricting the flow of the inflation medium from the first compartment 30 to the manifold 24.

The first flap 46 as described above is an example of one structure that may allow the flow of the inflation medium in one direction while restricting the flow of the inflation medium in the other direction. Alternatively, other structures may be disposed between the first opening 44 and the first compartment 30 that allow the flow of the inflation medium in one direction while restricting the flow of the inflation medium in the other, e.g., a baffle, etc.

With continued reference to FIGS. 3A-3C, the airbag 22 also includes a second one-way valve 36. The second one-way valve 36 is in fluid communication with the manifold 24 and the second compartment 32.

The second one-way valve 36, like the first one-way valve 34, may be of any suitable type that would allow the inflation medium to flow from the manifold 24 to the second compartment 32 in response to a positive pressure difference between the manifold 24 and the second compartment 32, and restrict the inflation medium from flowing from the second compartment 32 to the manifold 24 when there is a positive pressure difference between the second compartment 32 and the manifold 24. The first one-way valve 34 and the second one-way valve 36 may be the same type of one-way valves, or different types, such as the one-way valves described above.

As shown on FIGS. 3A-3C, the second one-way valve 36 in this example is the same type as the first one-way valve 34 discussed above. The second one-way valve 36 includes a second opening 52 extending through the outer panel 26 of the manifold 24, and in fluid communication with the second compartment 32 of the airbag 22. The second opening 52 of the second one-way valve 36 may have a different size than the first opening 44 of the first one-way valve 34, which may result in different amounts of the inflation medium flowing from the manifold 24 into the first compartment 30 relative to the second compartment 32 when the airbag 22 inflates to the inflated position.

The second one-way valve 36 includes a second flap 54 disposed between the outer panel 26 and the second compartment 32. The outer panel 26 may support the second flap 54. The second flap 54 may include two first edges 56 that are fixed to the outer panel 26, and two second edges 58 that are not fixed to the outer panel 26. The two first edges 56 of the second flap 54 may be spaced apart and substantially parallel relative to each other. One of the first edges 56 can be fixed to the outer panel 26 on one side of the second opening 52, and the other first edge 56 can be fixed to the outer panel on an opposite side of the second opening 52. The two second edges 58 of the second flap 54 can also be spaced apart and substantially parallel relative to each other, with one of the second edges 58 disposed on one side of the second opening 52, and the other second edge 58 disposed on an opposite side of the second opening 52.

Referring to FIGS. 3A and 3C, when the pressure in the manifold 24 is greater than the pressure in the second compartment 32, the second edges 58 of the second flap 54 can separate from the outer panel 26, and the inflation medium can flow from the manifold 24 to the second compartment 32. As shown in FIG. 3B, when the pressure in the second compartment 32 is greater than the pressure in the manifold 24, the second edges 58 of the second flap 54 can contact the outer panel 26, restricting the flow of the inflation medium from the second compartment 32 to the manifold 24.

The first compartment 30 of the airbag 22 is external to the inflation chamber 28 and may be connected, e.g., stitched, to the outer panel 26 of manifold 24, as shown in FIGS. 2, and 3A-3C. As set forth above, the first compartment 30 is in fluid communication with the first one-way valve 34, and the first one-way valve 34 is in fluid communication with the inflation chamber 28 of the manifold 24. When the inflator 42 is activated and fills the inflation chamber 28 of the manifold 24 with the inflation medium, a positive pressure difference exists between the manifold 24 and the first compartment 30. The first one-way valve 34 may open in response, and the inflation medium can flow from the manifold 24 to the first compartment 30.

As shown in FIGS. 3C and 3D, the first compartment 30 can include one or more tethers 60 fixed to an interior surface 66 of the first compartment 30. The tethers 60 have a first end 62 and a second end 64. The first ends 62 may be fixed to a vehicle-forward portion of the interior surface 66 of the first compartment 30, and the second ends 64 may be fixed to a vehicle-rearward portion of the interior surface 66. The tethers 60 are fixed to the interior surface 66 of the first compartment 30 such that when the airbag 22 is in the inflated position, the first compartment 30 includes two end portions 68 and a middle portion 70, with the two end portions 68 extending further in a vehicle-rearward direction than the middle portion 70. In other words, the two end portions 68 extend from the middle portion 70 in a vehicle-rearward direction.

The first compartment 30 may also include a first external vent 72, as shown in FIG. 3C. The first external vent 72 extends through the first compartment 30. The first external vent 72 provides a path such that the inflation medium can exit the first compartment 30. The first external vent 72 can be of any size, and the first compartment 30 may include any suitable number of first external vents 72. In this way, the first compartment 30 may be further tuned for stiffness to allow for the first compartment 30 to be independently tuned to absorb energy from different parts of the occupant 38 during an impact event.

As discussed above and shown in FIGS. 2-3C, the airbag 22 also includes the second compartment 32. The second compartment 32 is external to the inflation chamber 28 and connected to the outer panel 26 of manifold 24. The second compartment 32 is spaced from the first compartment 30, and in fluid communication with the second one-way valve 36. The second one-way valve 36 is also in fluid communication with the inflation chamber 28 of the manifold 24. Consequently, when the inflator 42 is activated and fills the inflation chamber 28 of the manifold 24 with the inflation medium, a positive pressure difference exists between the manifold 24 and the second compartment 32. In response, the second one-way valve 36 can open, and the inflation medium can flow from the manifold 24 to the second compartment 32.

Like the first compartment 30, the second compartment 32 may also include one or more tethers 60 fixed to an interior surface 74 of the second compartment 32, as shown in FIG. 3C. As with the first compartment 30, the tethers 60 in the second compartment 32 may be fixed to the interior surface 74 of the second compartment 32 in such a manner that when the airbag 22 is in the inflated position, the second compartment 32 includes two end portions 76 and a middle portion 78, with the two end portions 76 extending further in a vehicle-rearward direction than the middle portion 78, as shown on FIGS. 2-3B. In other words, the two end portions 78 extend from the middle portion 78 in a vehicle-rearward direction.

The second compartment 32 may include a second external vent 80 extending through the second compartment 32, as shown in FIG. 3C. The second external vent 80 provides a path such that the inflation medium can exit the second compartment 32. The second external vent 80 may have a different size than the first external vent 72.

As with the first external vent 72 discussed above, the second external vent 80 can be of any size, and the second compartment 32 may include any suitable number of second external vents 80. In this way, the second compartment 32 may also be further tuned for stiffness to allow for the second compartment 32 to be independently tuned to absorb energy from different parts of the occupant 38, such as a head, torso and extremities of the occupant 38, during an impact event.

The airbag 22 may be formed of any suitable airbag material, such as a woven polymer. For example, the airbag 22 may be formed of woven nylon yarn, e.g., nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

With reference to FIG. 4, the airbag assembly 18 may include the housing 20. The airbag 22, a positioning tether 82, and the inflator 42 may be disposed in the housing 20 in the uninflated position. The housing 20 can be of any suitable type, and formed from any suitable material, such as plastic, metal, composite, etc. An external surface 88 of the housing 20 may have brackets (not shown) attached thereto for fixedly mounting the airbag assembly 18 to a frame (not shown) of the seatback 14.

The housing 20 can include a cover 92. The cover 92 of the housing 20 is configured to open when the airbag 22 inflates to the inflated position. In the example of the cover 92 shown in FIG. 4, the cover 92 includes a seam 94 that tears when the airbag 22 inflates to the inflated position. In this way, the airbag 22 extends from the housing 20 through the cover 92. The seam 94 can be of any suitable type, such as a C, H, or an I seam.

As shown in FIG. 3C, the positioning tether 82 positions the airbag 22 during inflation of the airbag 22 to the inflated position. The positioning tether 82 may include a first end 84 and a second end 86 spaced from the first end 84. The first end 84 of the positioning tether 82 may be fixed to the housing 20, such as the interior surface 90 of the housing 20, in any suitable manner, including fasteners, adhesives, and the like.

With continued to FIG. 3C, the second end 86 of the positioning tether 82 is fixed to the airbag 22, e.g., the manifold 24. The second end of the positioning tether is fixed to the airbag 22 in any suitable manner, e.g., stitching, adhesives, etc. The positioning tether 82 is of a length, e.g., 6 inches, to allow the airbag 22 to pivot relative to the seatback 14 when the airbag 22 is in the inflated position. As such, if the seatback 14 is inclined at an angle, the airbag 22 is positioned in substantially the same way relative to the occupant 38. The positioning tether 82 may be formed from any suitable material, e.g., fabric, etc.

A schematic of the impact absorbing system 100 which includes an impact sensing system 102, the inflator 42, and the airbag 22 is shown in FIG. 5. The impact sensing system 102 may include at least one sensor 104 for sensing impact of the vehicle 10, and a controller 106 in communication with the sensor 104 and the inflator 42 for activating the inflator 42, e.g., for providing an impulse to a pyrotechnic charge of the inflator 42, when the sensor 104 senses an impact of the vehicle 10. Alternatively or additionally to sensing impact, the impact sensing system 102 may be configured to sense impact prior to impact, i.e., pre-impact sensing. The sensor 104 may be of any suitable type, e.g., using radar, lidar, and/or a vision system. The vision system may include one or more cameras, CCD image sensors, and/or CMOS image sensor, etc.

The controller 106 may be a microprocessor-based controller. The controller 106 may include a processor, memory, etc. The memory of the controller 106 may store instructions executable by the processor.

The sensor 104 is in communication with the controller 106 to communicate data to the controller 106. Based on the data communicated by the sensor 104, the controller 106 instructs the inflator 42 to activate. The controller 106 may be programmed to activate the inflator 42 to inflate the airbag 22 to the inflated position in response at least to a front impact of the vehicle 10. Specifically, the sensor 104 may sense the front impact and, based on the sensed front impact, the controller 106 may provide an instruction to the inflator 42 to inflate the airbag 22.

The controller 106 and the sensor 104 may be connected to a communication bus 108, such as a controller area network (CAN) bus, of the vehicle 10. The controller 106 may use information from the communication bus 108 to control the activation of the inflator 42. The inflator 42 may be connected to the controller 106, as shown in FIG. 5, or may be connected directly to the communication bus 108.

In operation, the airbag 22 is in the uninflated position, as shown in FIGS. 1 and 4, under normal operating conditions of the vehicle 10. When the sensor 104 senses an impact of the vehicle 10, the impact sensing system 102 triggers the inflator 42 to inflate the airbag 22 with the inflation medium from the uninflated position to the inflated position. In particular, based on the type of impact sensed by the impact sensing system 102, the impact sensing system 102 inflates the airbag 22 to the inflated position as shown in FIGS. 2 and 3A-3C.

The disclosure has been described in an illustrative manner, and it is to be understood that the terminology used is intended to be in the nature of words of description rather than of limitation. Many modifications and variations of the present disclosure are possible in light of the above teachings, and the invention may be practiced otherwise than as specifically described.

What is claimed is:

1. A vehicle seat assembly comprising:
   a seat back;
   an airbag housed in the seat back in an uninflated position and being inflatable to an inflated position extending from the seat back;
   the airbag including a manifold having an outer panel and an inflation chamber defined in part by the outer panel;
   a first compartment connected to the outer panel and positioned external to the inflation chamber;
   a second compartment connected to the outer panel and positioned external to the inflation chamber and spaced from the first compartment; and
   a first one-way valve in fluid communication with the manifold and the first compartment and a second one-way valve in fluid communication with the manifold and the second compartment.

2. The vehicle seat assembly of claim 1, wherein at least one of the first and second compartments includes two end portions and a middle portion, the two end portions extending further in a vehicle-rearward direction relative to the middle portion when the at least one of the first and second compartments is in an inflated position.

3. The vehicle seat of claim 1, wherein the first compartment extends upwardly from the manifold in a substantially vertical direction when the first compartment is in an inflated position, and the second compartment extends downwardly from the manifold in a substantially vertical direction when the second compartment is in an inflated position.

4. The vehicle seat of claim 1, wherein the seat back has a top end, and the airbag is housed proximate the top end.

5. An airbag comprising:
   a manifold having an outer panel and an inflation chamber defined at least in part by the outer panel;
   a first compartment connected to the outer panel and positioned external to the inflation chamber;
   a second compartment connected to the outer panel and positioned external to the inflation chamber and spaced from the first compartment;
   a first one-way valve in fluid communication with the manifold and the first compartment and a second one-way valve in fluid communication with the manifold and the second compartment; and
   at least one of a first external vent in the first compartment and a second external vent in the second compartment.

6. The airbag of claim 5, wherein the first one-way valve opens in response to a positive pressure difference between the manifold and the first compartment.

7. The airbag of claim 6, wherein the first one-way valve includes a first opening extending through the outer panel between the inflation chamber and the first compartment, and a first flap disposed between the outer panel and the first compartment.

8. The airbag of claim 7, wherein the first flap is supported by the outer panel.

9. The airbag of claim 8, wherein the first flap includes a first edge fixed to the outer panel and a second edge disconnected from the outer panel.

10. The airbag of claim 5, wherein the second one-way valve opens in response to a positive pressure difference between the manifold and the second compartment.

11. The airbag of claim 10, wherein a first one-way valve includes a first opening extending through the outer panel and a first flap disposed between the outer panel and the first compartment, and second one-way valve includes a second opening having a different size than the first opening.

12. The airbag of claim 5 further comprising a housing with the manifold supported by the housing and a positioning tether fixed to the housing and to the manifold.

13. The airbag assembly of claim 5, wherein the first compartment extends upwardly from the manifold in a substantially vertical direction when the first compartment is in an inflated position.

14. The airbag assembly of claim 5, wherein the second compartment extends downwardly from the manifold in a substantially vertical direction when the second compartment is in an inflated position.

15. The airbag assembly of claim 5, wherein the first external vent has a different size then the second external vent.

\* \* \* \* \*